United States Patent [19]

Kiyonaga et al.

[11] Patent Number: 5,247,403
[45] Date of Patent: Sep. 21, 1993

[54] APPARATUS AND METHOD FOR REPRODUCING DATA OF A RECORDING MEDIUM

[75] Inventors: Chitoku Kiyonaga; Kengo Sudoh, both of Higashi-Hiroshima, Japan

[73] Assignee: Sharp Kabushiki Kaisha, Osaka, Japan

[21] Appl. No.: 393,792

[22] Filed: Aug. 15, 1989

[30] Foreign Application Priority Data

Aug. 15, 1988 [JP] Japan .............................. 63-202946

[51] Int. Cl.$^5$ ............................................. G11B 15/48
[52] U.S. Cl. .................................... 360/74.4; 360/27; 360/62
[58] Field of Search ...................... 360/62, 74.4, 10.1, 360/18.2, 27

[56] References Cited

U.S. PATENT DOCUMENTS

| | | | |
|---|---|---|---|
| 4,331,986 | 5/1982 | Mori | 360/74.4 |
| 4,463,391 | 7/1984 | Takano et al. | 360/74.4 |
| 4,821,129 | 4/1989 | Culp | 360/74.4 |

OTHER PUBLICATIONS

*Dictionary of Computers, Information Processing and Telecommunications* by Jerry M. Rosenberg ©1987, p. 608, published by John Wiley & Sons.
*Running MS DOS* by Van Wolverton ©1989, pp. 310-312, 428-430, 445, 446 and 487-489 published by Microsoft Press.
*Microprocessors and Programmed Logic* by Kenneth L. Short ©1987, pp. 137-140, published by Prentice-Hall, Inc.
*The 8086/8088 Family: Design, Programming and Interfacing* by John Uffenbeck ©1987, pp. 91-93 and 159-161 published by Prentice-Hall Inc.

*Primary Examiner*—Vincent P. Canney

[57] ABSTRACT

In a DAT (digital audio tape) recorder in which data is recorded and reproduced in a helical scanning system by using a rotary head, a magnetic tape is firstly wound back for usual reproduction when performing reverse reproduction. Data thus reproduced is once memorized in a memory, and data is outputted in the reverse sequence of the reproduction sequence from the memory. In this kind of reverse reproduction movement, the total sum of the number of data in each recording area is obtained by detecting the number of data thereof when winding back the magnetic tape. Winding back is stopped when this total sum exceeds the memory capacity of the memory. After that, usual reproduction is carried out and data after the next recording area of the recording area in which the total sum exceeds the capacity of the memory is memorized one after another in the memory. Therefore, it is possible to vary the distance of winding-back of the magnetic tape according to the number of data recorded in the recording areas, thereby causing the memory to be very effectively utilized.

7 Claims, 6 Drawing Sheets

APPARATUS AND METHOD FOR REPRODUCING DATA OF A RECORDING MEDIUM

BACKGROUND OF THE INVENTION

Field of the Invention

This invention relates to an apparatus and method for reproducing a recording medium, which is used for reproducing information from a magnetic tape, etc. on which data of a computer is recorded, for instance in a rotary head type magnetic recording and reproduction apparatus.

Description of the Background Art

FIG. 1 is a view showing track patterns of a magnetic tape 41 on which data is recorded by a rotary head type magnetic recording and reproduction apparatus. Tracks A0, A1, A2, ... are the portions recorded by a magnetic head 42a. Data on these tracks A0, A1, A2, ... are read out by the magnetic head 42a. Also, tracks B0, B1, B2, ... are the portions recorded by another magnetic head 42b, and data on these tracks B0, B1, B2, ... are read out by the magnetic head 42b. The track A0 is divided into main data recording portion M and control data recording portions S1 and S2. For example, data of a computer is recorded on the main data recording portion M, and the number of data recorded in the main recording portion M is recorded in the control data recording portions S1 and S2.

The control data recording portion S1 is divided into a plurality of recording areas, and similar data corresponding to the number of data recorded in the main data recording portion M is recorded in respective recording areas. The control data recording portion S2 includes data similar to that of the control data recording portion S1. Therefore, even though a magnetic tape 41 is caused to travel in either the normal direction (the direction of an arrow 46F) or the reverse direction (the direction of an arrow 46B) at a faster speed by several times to several decades of times than usual traveling speed, it is possible to read out data from the control data recording portions S1 and S2. Tracks A1, A2, ... and tracks B1, B2, ... are also in a manner similar to that of track A0. A track Ai (i=0, 1, 2, ... ) and a track Bi constitute a frame Fi.

In the case output from the computer is recorded on a magnetic tape 41 by a helical scan system such as the above DAT system or a VTR system, there may be a case that a part of data stored in the magnetic tape 41 is desired to be read out and visually displayed. At this time, data in each of the tracks recorded in this magnetic tape 41 can be reproduced and displayed in proper order, and if data of each of the tracks can be reproduced in reverse order, it is very convenient for searching or reference.

When the magnetic tape 41 on which data has been recorded with such track patterns as shown in the above FIG. 1 is reproduced by traveling in the opposite direction of the usual traveling direction in the rotary head type recording and reproducing apparatus, strictly speaking, when reproducing data per frame, which has been recorded on the magnetic tape 41, in the reverse sequence of the sequence of the frames (hereinafter these movements are called merely "reverse reproduction"), the magnetic heads 42a and 42b can not accurately trace the tracks by traveling along the magnetic tape 41 in the reverse direction, and it is impossible to secure accurate reproduction movements.

Namely, in FIG. 1, in recording, tracks are formed in the direction of vector 45 which expresses the sum of vector 43 which expresses the tracing direction and the tracing speed of the magnetic heads 42a and 42b and vector 44 which expresses the tracing direction and the traveling speed of the magnetic tape 41. Therefore, in the case the magnetic tape 41 is caused to travel in the direction of vector 47, the magnetic heads 42a and 42b trace on the magnetic tape 41 in the direction of vector 48 which is the sum of the vector 43 and the vector 47, thereby causing the magnetic heads 42a and 42b to inaccurately trace on the tracks.

Hence, in the case of reverse reproduction, firstly the magnetic tape 41 is caused to travel in the reverse direction and comes to a stop after the magnetic tape 41 travels for a specified distance. Next, usual reproduction is conducted from the frame at the point where the magnetic tape 41 has stopped, to the frame from which reverse reproduction is started. Data of each of the frames reproduced therein is memorized in a memory. When data is outputted from the memory, data is outputted in the reverse sequence of the sequence of the frames on reproduction.

As the magnetic tape 41 is caused to travel in the reverse direction for a specified distance and usual reproduction is conducted when conducting the reverse reproduction in the aforementioned method, the number of frames which are reproduced per reverse reproduction is constant at all times. However, the number of data which is recorded in each of the frames is not necessarily constant. Therefore, the number of all the data memorized in the memory in a cycle of reverse reproduction is not necessarily constant. So, when the data memorized is minimal, there is a problem that the memory can not be effectively utilized.

SUMMARY OF THE INVENTION

It is hence an object of the invention to provide an apparatus and method for reproduction of data of a recording medium, in which a memory to be used during reverse reproduction can be effectively utilized, for instance, in a rotary head type magnetic recording and reproduction apparatus.

According to an aspect of the invention there is provided an apparatus for reproducing a recording medium, in which data stored in the recording medium is read out by moving the recording medium, data is stored in a plurality of recording areas along the moving direction in the recording medium and data is also sequentially stored along the moving direction in the recording areas, comprising:

a memory having memory capacity smaller than that of the recording medium, means for detecting the volume of data stored in the recording medium when moving the recording medium in the reverse direction of the moving direction, means for stopping the moving of the recording medium when the detected data volume exceeds the memory capacity of the memory in response to the output of the data volume detecting means, means for controlling the storing of data which is stored in the recording medium, in the memory per recording area in response to the output of the reading means when moving the recording medium again in the moving direction, and means for reading out the data stored in the memory from each of the recording areas in the opposite direction of the moving direction.

Also the invention presents an apparatus for reproducing data of a recording medium in which another data to express the volume of data stored in each of the recording areas is stored in the respective recording areas, comprising:

means for reading the data to express the data volume when moving the recording medium in the opposite direction of the moving direction.

Further, the invention presents an apparatus for reproduction data of a recording medium, in which the recording medium is a magnetic tape and data is recorded by a helical scan system wherein the recording areas are an area inclined with a track angle in the lengthwise direction of the magnetic tape.

The invention presents an apparatus for reproducing data of a recording medium in which data to expressive of the data volume is written a plural number of times in every recording area.

Also the invention presents an apparatus for reproducing data of a recording medium wherein a plurality of recording areas are defined, data is reproduced in each of the recording areas and data thus reproduced is memorized in memory, characterized by that;

main data recording portion and control data recording portions are provided in each of the recording areas and at least the number of data recorded in the main data recording portion is recorded in the control data recording portions, and that when data is reproduced by moving the recording medium in the opposite direction of the predetermined moving direction the total sum is operated by detecting the number of data in each of the recording areas, and when the corresponding total sum exceeds the memory capacity of the memory the recording medium comes to a stop in the opposite direction, thereby causing data to be reproduced.

Still further, the invention presents a data reproduction method of a recording medium by which data is stored in a plurality of recording areas along the predetermined moving direction, data is sequentially stored along the moving direction in each of the recording areas, and data thus reproduced is memorized in a memory, featuring that;

the volume of data stored in the recording medium is detected by moving the recording medium in the opposite direction of the moving direction, the recording medium stops moving when the volume of data thus detected exceeds the memory capacity, data is reproduced by moving the recording medium in the moving direction and the data thus reproduced is stored in a memory in each of the recording areas, and the data stored in the memory is read out in each of the recording areas in the sequence of the opposite direction of the moving direction.

The invention provides an apparatus for reproducing data of a recording medium in which a plurality of recording areas are defined, main data recording portion and a control data recording portion are provided in each of the corresponding recording areas, at least the number of data recorded in the main data recording portion is recorded in the control data recording portions, data is reproduced in each of the recording areas and data thus reproduced is memorized in memory, wherein when data is reproduced by moving the recording medium in the opposite direction of the determined moving direction the data recorded in the control data recording portions of each of the recording areas, specifically the number of data recorded in the main data recording portion is sequentially detected for operation of the total sum as moving the recording medium in the opposite direction. When the total sum exceeds the memory, capacity of the memory the recording medium stops moving in the opposite direction and data is reproduced by moving the recording medium in the predetermined moving direction from the point where the recording medium stops, and the reproduced data is memorized in memory means and is outputted in the reverse sequence of reproduction.

Thus, according to the invention, the memory can be effectively used during reverse reproduction of the recording medium. Also, in the case the memory has smaller capacity than a conventional memory, smooth reverse reproduction can be conducted also.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects, features and advantages of the invention will become apparent from the following description taken in conjunction with the accompanying drawings, which are given by way of illustration only and thus are not limitative of the present invention, and wherein.

DESCRIPTION OF THE PREFERRED EMBODIMENT

The invention will be hereinafter described in detail with reference to the attached drawings.

Figure 1:
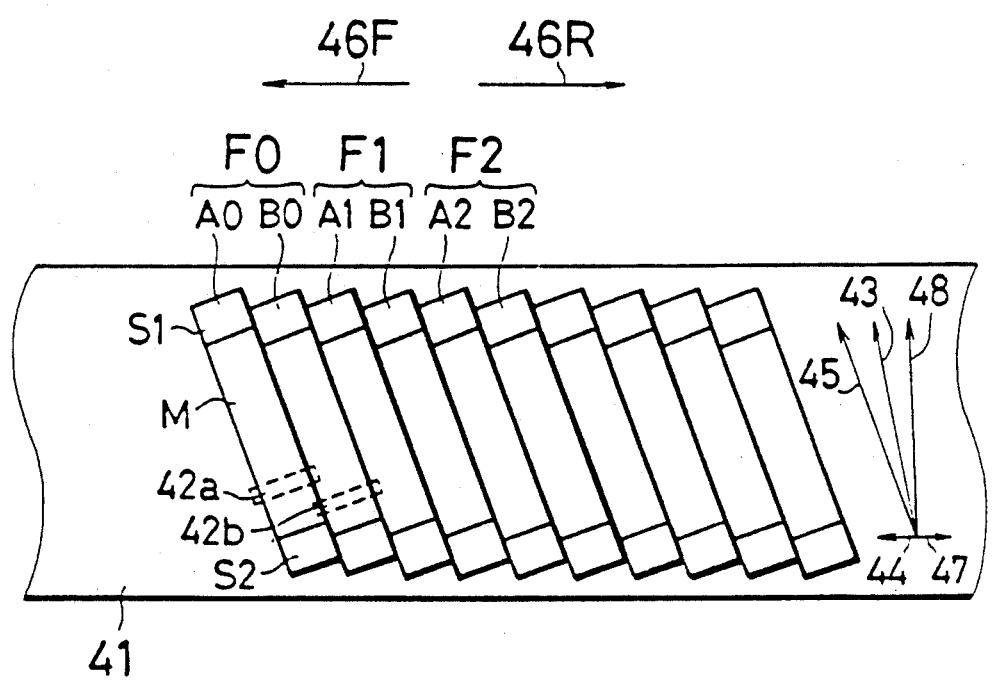
FIG. 1 is a view showing track patterns of a magnetic tape 41.
Figure 2:
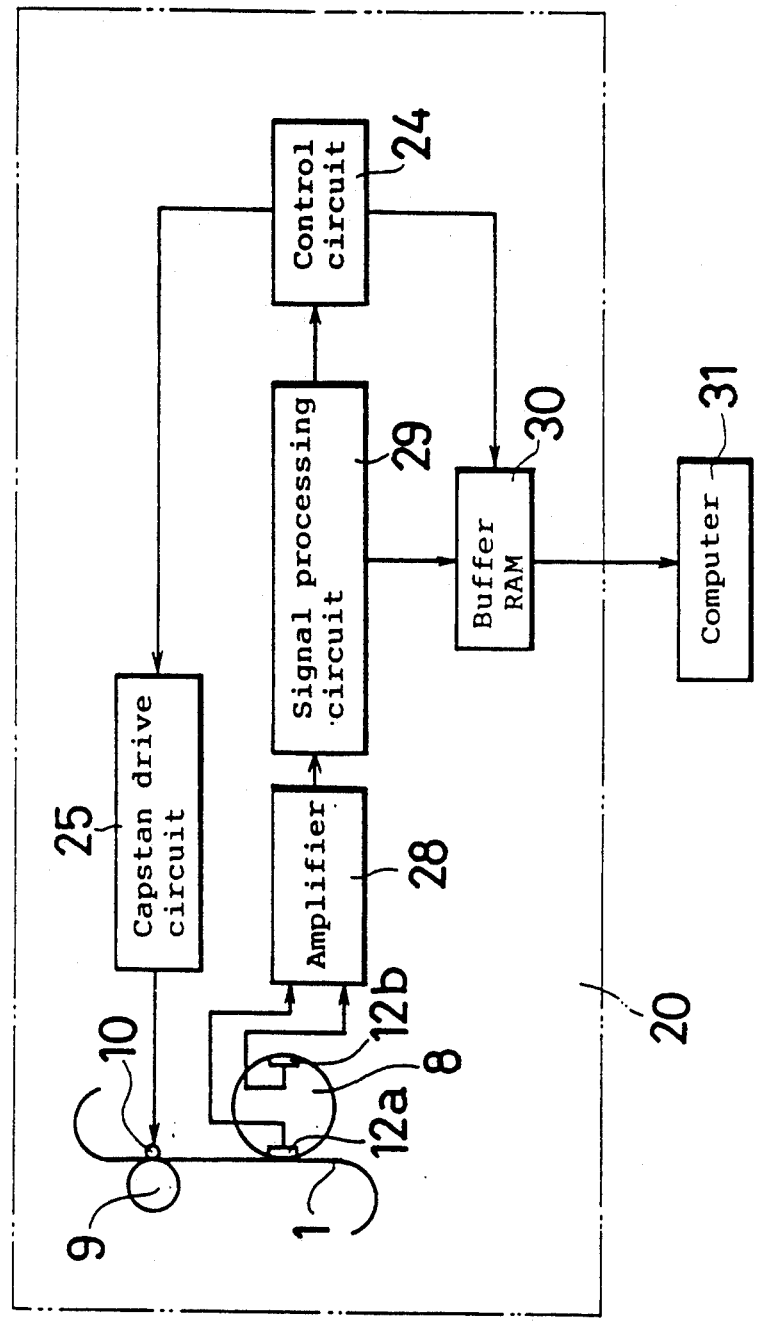
FIG. 2 is a block diagram showing the basic construction of a magnetic recording/reproduction apparatus 20 in accordance with an embodiment of the invention.

FIG. 2 is a block diagram showing the basic construction of a magnetic recording/reproduction apparatus 20 in accordance with an embodiment of the invention. A magnetic tape 1 is pressure fit to a capstan 10 which is normally and reversibly rotatable, by means of a pinch roller 9. The magnetic tape 1 can travel by rotation of the capstan 10. A rotary drum 8 is so mounted that magnetic heads 12a and 12b are opposed by 180° from each other.

The capstan 10 is rotated by a capstan drive circuit 25 on the basis of control signals coming from a control circuit 24. Reproduction signals which are reproduced by the magnetic heads 12a and 12b attached to the rotary drum 8 are amplified by an amplifier 28 and are applied to a signal processing circuit 29. The signal processing circuit 29 carries out demodulation processing for demodulating the reproduction signals to data and it corrects errors by parity check codes. Then, the corresponding data is given to the control circuit 24 and the buffer RAM 30. The buffer RAM 30 memorizes the reproduced data and supplies data to a computer 31 according to the control signals from the control circuit 24.

Figure 3:
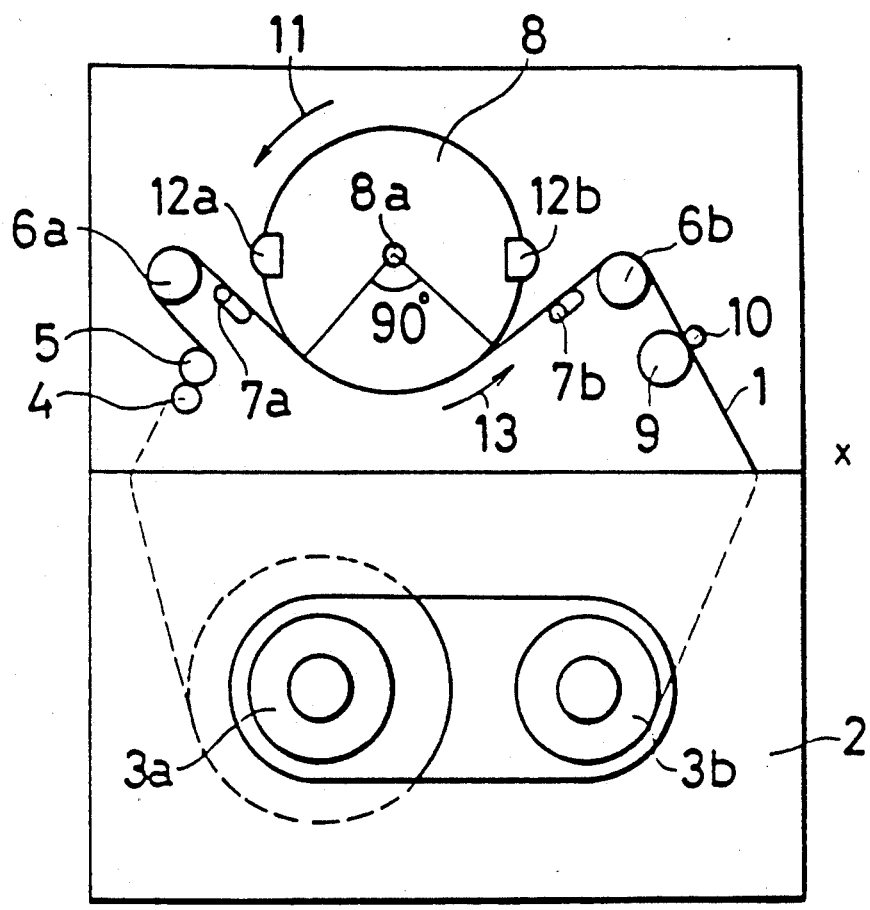
FIGS. 3(1) and 3(2) are illustrating the traveling mechanism of a magnetic tape in the magnetic recording/reproduction apparatus 20.
Figure 3:
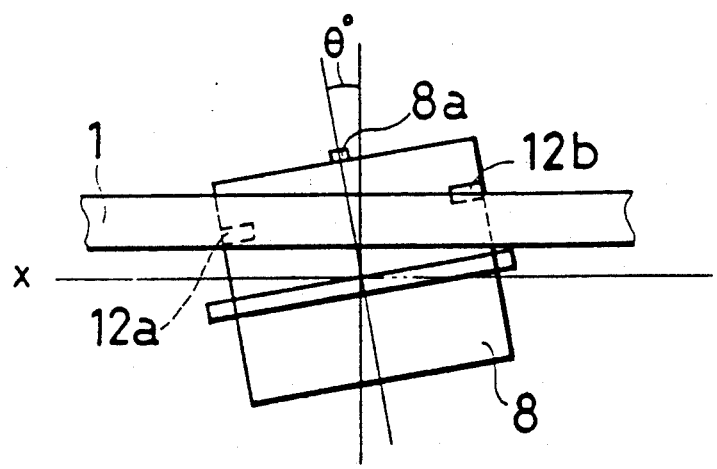

FIG. 3 is a view showing the traveling mechanism of a magnetic tape 1 in a rotary head type magnetic recording/reproduction apparatus 20. FIG. 3 (1) shows a cassette 2 loaded in the magnetic recording/reproduction apparatus. The magnetic tape 1 is wound on the supply side reel 3a and the winding side reel 3b of the cassette 2, respectively. The traveling mechanism includes a post 4, a tension post 5, guide rollers 6a and 6b, inclination posts 7a and 7b, a rotary drum 8, a pinch roller 9 and a capstan 10.

The post 4 and the tension post 5 are provided in order to keep the tension of the magnetic tape 1 given to the rotary drum 8 constant. The rotary drum 8 is rotated in the direction of an arrow 11, and the magnetic heads 12a and 12b are mounted on this rotary drum 8 as being opposed by 180° from each other. The magnetic heads 12a and 12b have different azimuth angles in order to prevent noises due to cross talk, for instance an azimuth angle of +20° at the magnetic 12a and another azimuth angle of −20° for magnetic head 12b. As shown in FIG. 3 (2), the rotary drum 8 has a rotary axis 8a inclined by θ° from the "y" axis on the plane "xy".

Figure 4:
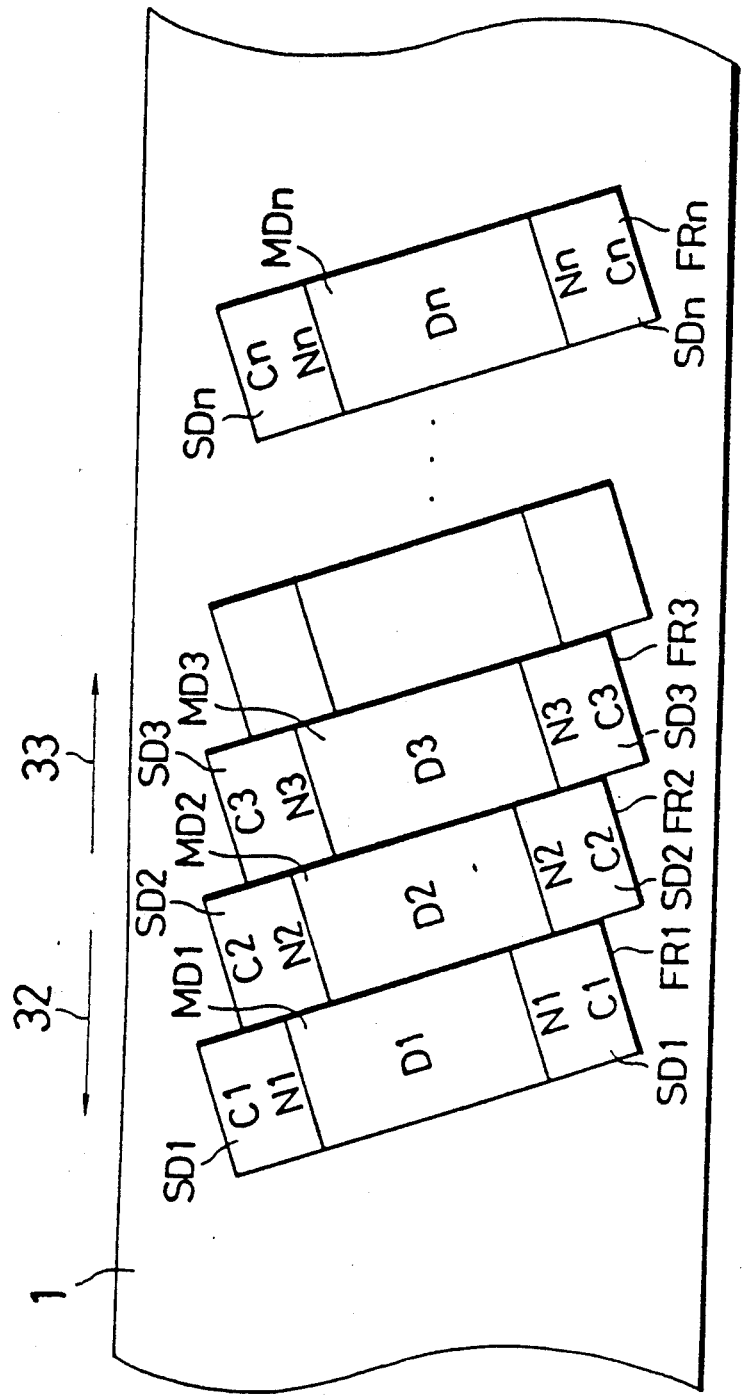
FIG. 4 is a view showing frame patterns of a magnetic tape 1 recorded by the magnetic recording/reproduction apparatus 20.

The magnetic tape 1 is wound with a winding angle of about 90° to the rotary drum 8 by means of the guide rollers 6a and 6b and the inclination posts 7a and 7b. When recording data on the magnetic tape 1, the magnetic tape 1 is caused to travel in the direction of an arrow 13 by means of the pinch roller 9 and the capstan 10, thereby causing the magnetic heads 12a and 12b to trace the surface of the magnetic tape 1 one after another and data to be recorded with such trace patterns as shown in FIG. 4.

The frame FRi (i=1, 2, 3, ...) consists of one main data recording portion MDi and two control data recording portions SDi. Data Di is recorded in the main data recording portion MDi, and a frame number Ni which is a distinguisher information and the number Ci indicative of data of the data Di are recorded in the control data recording portion SDi. The frame number is, for instance, a sequential number added to one by one during recording and thereafter recorded onto tape.

The control data recording portion SDi is divided into a plurality of recording areas, and the same data (frame number Ni, number Ci of data, etc.) is recorded in respective recording areas, thereby causing the control data recording portion SDi to read out data even though the magnetic tape 1 travels in the normal direction (direction of an arrow 32) or in the reverse direction (direction of an arrow 33) at a faster speed by several times to several decades of times than usual traveling speed.

Figure 5:
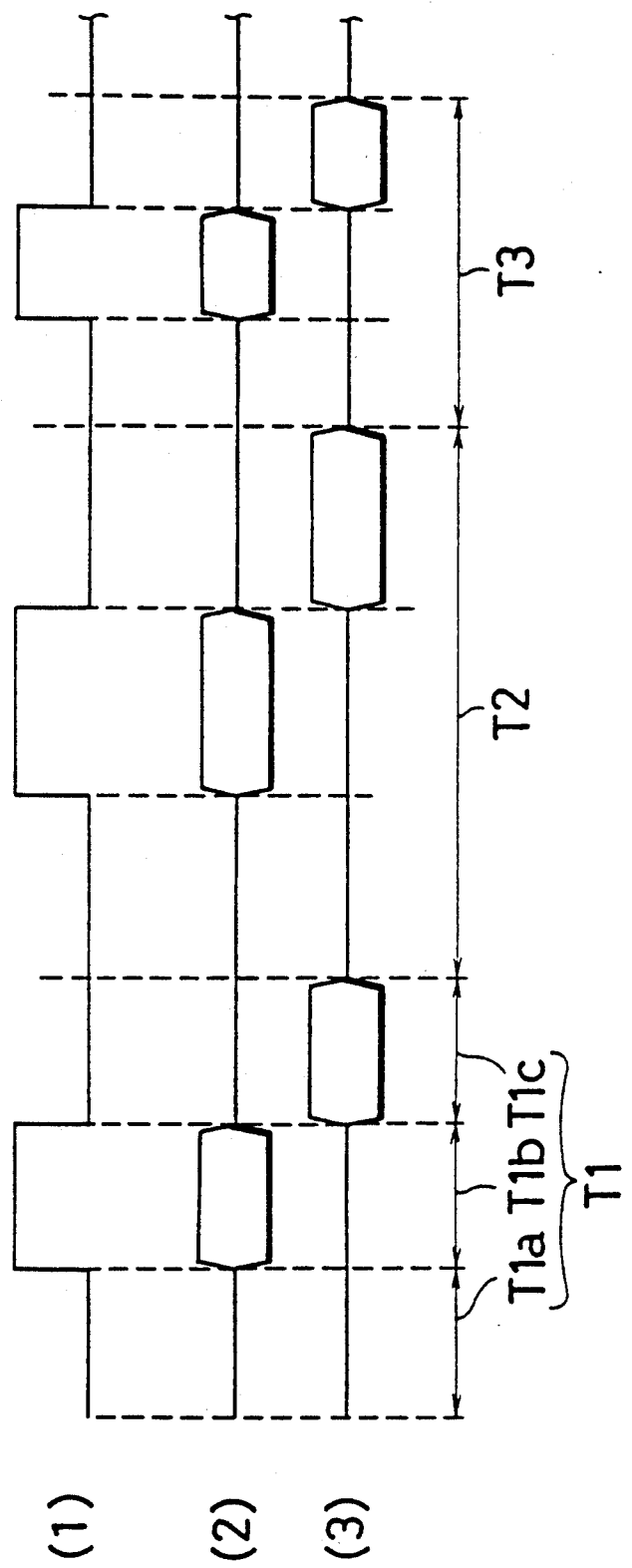
FIG. 5 is a timing chart illustrating the reverse reproduction movement of a magnetic tape 1.

FIG. 5 is a timing chart illustrating the reverse reproduction movement of the magnetic tape 1. FIG. 5 (1) shows the traveling conditions of the magnetic tape 1, and the magnetic tape 1 is in a high level when traveling in the normal direction or in a low level when traveling in the reverse direction. FIG. 5 (2) shows reproduction signals of the magnetic tape 1, and FIG. 5 (3) shows output signals of the buffer RAM 30, respectively. Each of the terms of time T1, T2, and T3 is the term of a reverse reproduction movement. The magnetic tape 1 is caused to travel in the reverse direction in the term T1a during the reverse reproduction movement of the term T1 and is caused to travel in the normal direction in the term T1b for reproduction of data (Refer to FIG. 5 (2)). Thus, data is memorized in the buffer RAM 30. In the term T1C, the magnetic tape is again traveled in the reverse direction, and in the corresponding term T1C data is outputted from the buffer RAM 30. (Refer to FIG. 5 (3)). In the terms T2 and T3, movement similar to the term T1 is carried out.

According to the invention, when the magnetic tape 1 is firstly traveled in the reverse direction in a cycle of the reverse reproduction movement, in the case reverse reproduction is conducted by such a method as shown in the aforementioned description, the number of data recorded in each frame is read out. Then, as the total sum is operated and the corresponding total sum exceeds the capacity of the buffer RAM 30, the magnetic tape 1 is caused to travel in the normal direction for reproduction.

Figure 6:
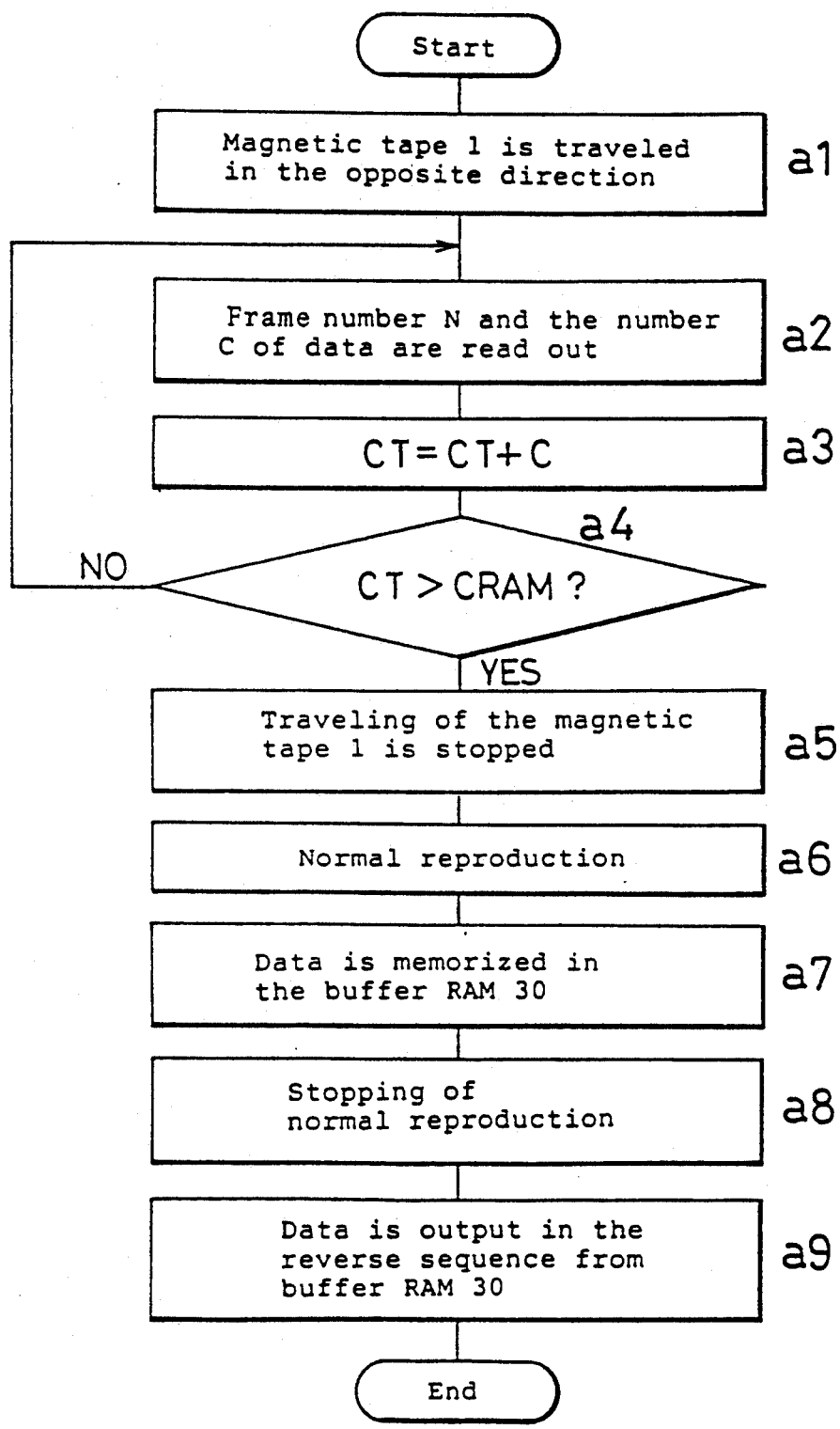
FIG. 6 is a flow chart illustrating a cycle of the reverse reproduction movement.

FIG. 6 is a flow chart illustrating a cycle of reverse reproduction movement of the magnetic tape 1 in the magnetic recording/reproduction apparatus 20. At the step a1, the magnetic tape 1 is caused to travel in the opposite direction of the normal traveling direction, and at the step a2, the frame number N and the number C of data in the control data recording portion of the frame are read out.

At the step a3, the number C of data, which has been read out at the step a2, is accumulated and added to the accumulated number CT of data. At the step a4, it is judged whether or not the accumulated number CT of data exceeds the capacity CRAM of the buffer RAM 30. Here in the case the answer is negative (NO), the processing returns to the step a2. In the case the answer is positive (YES), the processing goes further to the step a5 where the magnetic tape 1 is caused to stop traveling in the reverse direction. At the step a6, normal reproduction of the magnetic tape 1 is carried out. At the step a7, data of respective frames is sequentially reproduced and memorized in the buffer RAM 30. At the step a8, the magnetic tape 1 is caused to stop normal reproduction. At the step a9, data is outputted from the buffer RAM 30 in the reverse sequence of the sequence of the frame during reproduction.

It is assumed for explanation that the aforementioned reverse reproduction movement is conducted from the frame FRn in the above FIG. 4. As the magnetic tape 1 is caused to travel in the direction of an arrow 33, data of the control data recording portions SDn, ..., SD3, SD2, SD1 of each frame, specifically the frames Nn, ..., N3, N2 and N1 and the numbers Cn, ..., C3, C2 and C1 of data, are read. Then, these numbers Cn, ..., C3, C2, and C1 of data are accumulated and added by turns. For instance, in the case the accumulated number CT of data exceeds the capacity CRAM of of the buffer RAM 30, the magnetic tape 1 is caused to stop traveling, and usual reproduction is executed, thereby causing the data D2, D3, ..., Dn of the frames FR2, FR3, ..., FRn to be memorized in the buffer RAM 30 one after another. After that, usual reproduction is stopped, and data is outputted from the buffer RAM 30 in the order of data Dn, ..., D3, D2.

As shown in the aforementioned specification, according to the invention, it is possible to vary the number of frames to be reproduced in a cycle of the reverse reproduction movement in each of the reverse reproduction movements, thereby causing the buffer RAM 30 to be effectively utilized. Besides, it is possible to secure smooth reverse reproduction even with a buffer RAM whose capacity is smaller than conventional buffer RAMs. In addition, the invention is not limited to a magnetic tape and is applicable to such a recording medium as a disk-like magnetic recording medium or an optical disk.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method of reproducing data of a recording medium in which the data is stored in a plurality of recording areas along a predetermined moving direction, the data including control information for each recording area indicative of an amount of data stored in each respective recording area with the data being sequentially stored along the predetermined moving direction in each of the recording areas, the data thus being reproduced is memorized in the memory, the method comprising the steps of:

detecting a volume of data stored in the recording medium by moving the recording medium in an opposite direction of the predetermined moving direction to read and accumulate the control information;

stopping movement of the recording medium when the detected volume of data exceeds a memory capacity of the memory;

reproducing the data by moving the recording medium in the predetermined moving direction;

storing the reproduced data of the recording areas in the memory; and reading out the stored data from the memory in a sequence corresponding to the opposite direction of the predetermined moving direction, the recording medium being magnetic tape with the data recorded thereon by a helical scanning system.

2. An apparatus for reproducing data of a recording medium, in which the data is stored in the recording medium along a moving direction in recording areas and includes control information for each recording area indicative of an amount of data stored in each respective recording area, the data being read out through reading means by moving the recording medium in the moving direction, the apparatus comprising:

memory means, having a memory capacity smaller than that of the recording medium, for storing the data read out by the reading means;

volume detecting means, coupled to the reading means, for detecting a volume of data recorded in the recording medium while the recording medium is moved in a reverse direction of the moving direction and for generating a detected volume signal;

movement stopping means, coupled to a capstan drive means, for stopping movement of the recording medium in the reverse direction in response to said detected volume signal when the detected volume of data exceeds the memory capacity of said memory means and for thereafter returning movement of the recording medium to the moving direction;

storage control means, coupled between said memory means and the reading means, for storing the data of each recording area of the recording medium into said memory means, once the recording medium is returned to the moving direction; and memory read-out means, coupled to said memory means, for reading out the stored data of each of the recording areas in the reverse direction of the recording medium, said volume detecting means operable to accumulate the control information for each recording area to generate said detected volume signal.

3. The apparatus for reproducing data according to claim 2, the recording medium being a magnetic tape and the data is recorded by a helical scanning system, the recording areas each being an area inclined with a track angle in a lengthwise direction of said magnetic tape.

4. The apparatus for reproducing data according to claim 2, the control information being written a plural number of times in every recording area.

5. A method of reproducing data of a recording medium using a recording/reproducing apparatus in which a plurality of recording areas are defined in the recording medium in a predetermined direction, the data from each of the recording areas being reproduced and thus memorized in memory means, the recording medium comprising a main data recording portion and a control data recording portion provided in each of the recording areas, at least a number of data recorded in the main data recording portion being recorded in the control data recording portion, the method comprising the steps of:

moving the recording medium in an opposite direction of the predetermined direction;

reading the control data from each of the recording areas;

determining a total sum of data in the recording areas in the moved recording medium by accumulating the number of data designated by the control data for the recording areas; and stopping the movement of the recording medium in the opposite direction when the total sum exceeds a memory capacity of the memory means to thereby reproduce the data, the recording medium being magnetic tape with the data recorded thereon by a helical scanning system.

6. An apparatus for reproducing data of a recording medium, in which the data is stored in the recording medium along a moving direction in recording areas and includes control information for each recording area indicative of an amount of data stored in each respective recording area, the data being read out through reading means by moving the recording medium in the moving direction, the apparatus comprising:

memory means, having a memory capacity smaller than that of the recording medium, for storing the data read out by the reading means;

volume detecting means, coupled to the reading means, for detecting a volume of data recorded in the recording medium while the recording medium is moved in a reverse direction of the moving direction and for generating a detected volume signal;

movement stopping means, coupled to a capstan drive means, for stopping movement of the recording medium in the reverse direction in response to said detected volume signal when the detected volume of data exceeds the memory capacity of said memory means and for thereafter returning movement of the recording medium to the moving direction;

storage control means, coupled between said memory means and the reading means, for storing the data of each recording area of the recording medium into said memory means, once the recording medium is returned to the moving direction; and memory read-out means, coupled to said memory means, for reading out the stored data of each of the recording areas in the reverse direction of the recording medium, said volume detecting means operable to accumulate the control information for each recording area to generate said detected volume signal, the recording medium being magnetic tape with data recorded thereon by a helical scanning system with the recording areas each being an area inclined with a track angle in a lengthwise direction of the moving direction.

7. The apparatus for reproducing data according to claim 6, the control information being written a plural number of times in every recording area.

* * * * *